(12) United States Patent
Fournier

(10) Patent No.: US 11,816,985 B2
(45) Date of Patent: Nov. 14, 2023

(54) ELECTRICAL CABINETS

(71) Applicant: LOGISIG INC., Québec (CA)

(72) Inventor: Serge Fournier, Fossambault-sur-le-Lac (CA)

(73) Assignee: LOGISIG INC., Québec (CA)

( * ) Notice: Subject to any disclaimer, the term of this patent is extended or adjusted under 35 U.S.C. 154(b) by 113 days.

(21) Appl. No.: 17/441,539

(22) PCT Filed: Apr. 3, 2020

(86) PCT No.: PCT/CA2020/050441
§ 371 (c)(1),
(2) Date: Sep. 21, 2021

(87) PCT Pub. No.: WO2020/198873
PCT Pub. Date: Oct. 8, 2020

(65) Prior Publication Data
US 2022/0165153 A1    May 26, 2022

Related U.S. Application Data

(60) Provisional application No. 62/828,646, filed on Apr. 3, 2019.

(51) Int. Cl.
*G08G 1/07*    (2006.01)
*H04L 67/12*   (2022.01)

(52) U.S. Cl.
CPC .............. *G08G 1/07* (2013.01); *H04L 67/12* (2013.01)

(58) Field of Classification Search
CPC .................................. G08G 1/07; H04L 67/12
See application file for complete search history.

(56) References Cited

U.S. PATENT DOCUMENTS

| | | | | |
|---|---|---|---|---|
| 4,463,339 A | * | 7/1984 | Frick ...................... | G08G 1/097 340/916 |
| 4,704,610 A | * | 11/1987 | Smith ..................... | G08G 1/087 340/906 |
| 4,775,865 A | * | 10/1988 | Smith ..................... | G08G 1/087 340/906 |
| 5,172,113 A | * | 12/1992 | Hamer ................... | G08G 1/087 398/118 |
| 5,187,373 A | * | 2/1993 | Gregori .................. | G08G 1/087 340/906 |

(Continued)

*Primary Examiner* — Sisay Yacob
(74) *Attorney, Agent, or Firm* — Reno Lessard; Norton Rose Fulbright Canada LLP

(57) ABSTRACT

There is described an electrical cabinet for a traffic signaling system. The electrical cabinet generally has a housing; an input encoder, the input encoder having input ports receiving input signals carrying states associated with input devices of the traffic signaling system, a serial encoding circuit serially encoding the states of the input signals into a headerless signal, the headerless signal beginning with a first time slot and ending with a last time slot temporally spaced apart from the first time slot, the time slots carrying the states of the input signals, and an output port; and a traffic light controller having a serial decoding circuit receiving the headerless signal and serially decoding the headerless signal to retrieve the states of the input signals carried by the time slots of the headerless signal, the traffic light controller controlling the traffic signaling system based on the retrieved states.

20 Claims, 9 Drawing Sheets

(56) References Cited

U.S. PATENT DOCUMENTS

| | | | | |
|---|---|---|---|---|
| 5,208,584 | A * | 5/1993 | Kaye ..................... | G08G 1/097 340/916 |
| 5,822,711 | A * | 10/1998 | Ochoa-Chavez ...... | G08G 1/081 340/916 |
| 6,326,903 | B1 * | 12/2001 | Gross .................... | G08G 1/087 340/988 |
| 7,113,108 | B1 * | 9/2006 | Bachelder .............. | G08G 1/087 340/941 |
| 7,307,547 | B2 * | 12/2007 | Schwartz ............... | G08G 1/087 340/906 |
| 7,333,028 | B2 * | 2/2008 | Schwartz ............... | G08G 1/087 340/906 |
| 7,417,560 | B2 * | 8/2008 | Schwartz ............ | G08G 1/0965 340/906 |
| 7,432,826 | B2 * | 10/2008 | Schwartz ............... | G08G 1/087 340/902 |
| 7,515,064 | B2 * | 4/2009 | Schwartz ............... | G08G 1/087 340/904 |

\* cited by examiner

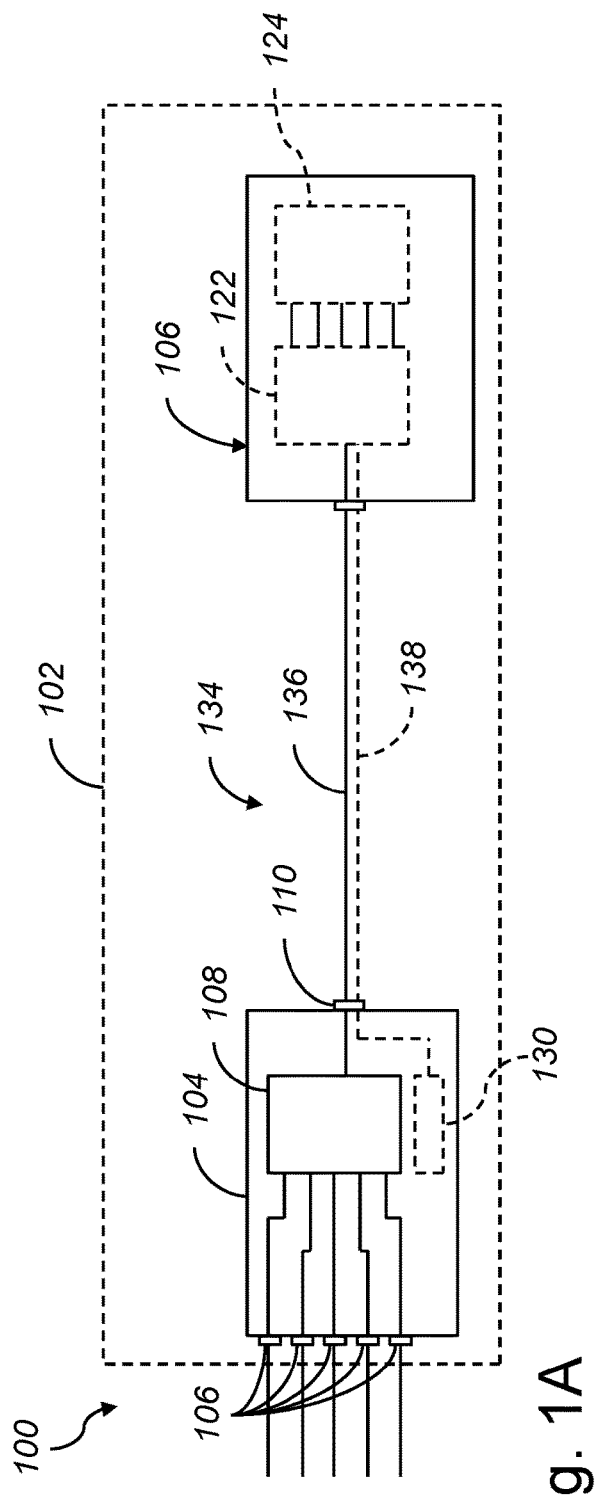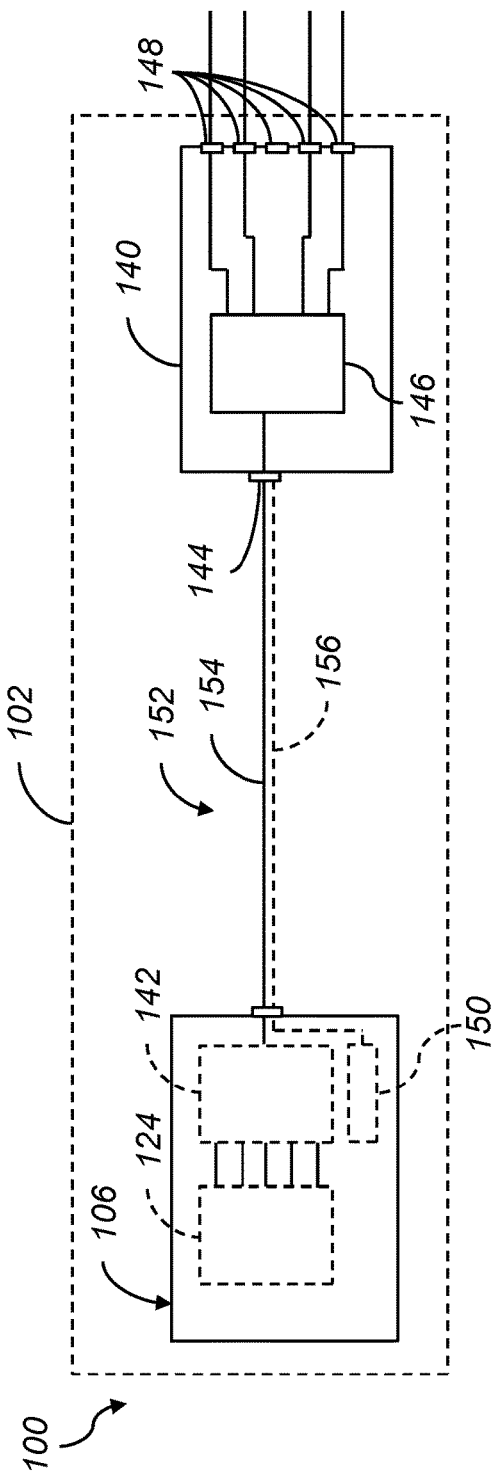

ELECTRICAL CABINETS

FIELD

The improvements generally relate to the field of electronic cabinets and more particularly to electronic cabinets for traffic signaling systems.

BACKGROUND

Traffic signaling systems generally include one or more traffic lights positioned at road intersections, pedestrian crossings and other locations susceptible to experience traffic flows. The traffic lights are generally controlled via a traffic light controller, which is connected to the traffic lights, so as to ensure as smooth and safe traffic as possible for vehicles, cyclists and/or pedestrians.

In practice, the traffic signaling system typically has input conductors and output conductors which may wiredly run underground towards a common location they are connected with the traffic light controller. Understandably, it was found convenient to connect the input and output conductors of the traffic signaling system to the traffic light controller within an electrical cabinet so as to suitably protect these connections.

It is generally known to connect the input and output conductors to an electrical interface inside the electrical cabinet, and to connect this electrical interface to the traffic light controller. With existing technologies, communication between the traffic light controller and the input and output conductors is performed using known communication protocols. Such communication protocols define rules, syntax and semantics, and are implemented into the electrical cabinet as a combination of hardware and software components. Although existing electrical cabinets are satisfactory to a certain degree, there remains room for improvement.

SUMMARY

In at least some situations, the implementation of the known communication protocols as a combination of hardware and software components can be complex, which was found to be detrimental to the longevity and robustness of the electrical cabinets. For instance, as the communication protocols are often times updated, the electrical cabinets can become obsolete, which then requires hardware and/or software updates. Updating the electrical cabinets is resource-consuming as it typically requires skilled technicians to reach the electrical cabinets, open them, and perform the update(s) manually. Moreover, the complexity associated with such communication protocols can lead to communication errors which can undesirably impact traffic flow.

Having regards to this aspect, there is described an electrical cabinet for a traffic signaling system. The electrical cabinet has a housing defining a cavity, a traffic light controller within the housing for controlling the traffic signaling system, an input encoder receiving input signals from the traffic signaling system, and an output decoder outputting output signals to the traffic signaling system. Communication between the traffic signaling system, the input encoder and the output decoder is performed via one or more headerless signals. Each headerless signal has a series of time slots, beginning with a first time slot, and ending with a last time slot. The time slots carry the states of the input or output signals, so as to alleviate the complexity of the communication occurring inside the electrical cabinet. As the communication is performed using headerless signals, which by definition do not incorporate headers having communication protocol dependent data to be read using predetermined rules, syntax, and semantics, it was found that the headerless communication occurring inside the electrical cabinet can alleviate at least some of the drawbacks mentioned above.

In accordance with a first aspect of the present disclosure, there is provided an electrical cabinet for a traffic signaling system, the electrical cabinet comprising: a housing; an input encoder within the housing, the input encoder having a plurality of input ports receiving a plurality of input signals carrying states associated with a plurality of input devices of the traffic signaling system, a serial encoding circuit serially encoding the states of the plurality of input signals into a headerless signal, the headerless signal beginning with a first time slot and ending with a last time slot temporally spaced apart from the first time slot, the time slots carrying the states of the plurality of input signals, and an output port outputting the headerless signal; and a traffic light controller within the housing and in communication with the input encoder, the traffic light controller having a serial decoding circuit receiving the headerless signal and serially decoding the headerless signal to retrieve the states of the plurality of input signals carried by the time slots of the headerless signal, the traffic light controller controlling the traffic signaling system based on the retrieved states associated with the plurality of input devices of the traffic signaling system.

Further in accordance with the first aspect of the present disclosure, the serial encoding circuit can for example encode a plurality of temporally spaced apart intermediate time slots between the first and last time slots of the headerless signal, the first, intermediate and last time slots carrying the states of the plurality of input signals.

Still further in accordance with the first aspect of the present disclosure, the serial encoding circuit can for example encode the plurality of input signals to respective, predetermined time slots of the headerless signal in accordance to a predetermined association.

Still further in accordance with the first aspect of the present disclosure, the serial decoding circuit of the traffic light controller can for example associate the time slots of the headerless signal to respective, predetermined ones of the plurality of input signals in accordance with the predetermined association.

Still further in accordance with the first aspect of the present disclosure, the electrical cabinet can for example comprise at least a conductor connecting the input encoder and the traffic light controller to one another and via which the headerless signal is communicated.

Still further in accordance with the first aspect of the present disclosure, the electrical cabinet can for example comprise an electrical interface via which the input encoder and the traffic light controller are connected to one another.

Still further in accordance with the first aspect of the present disclosure, the input encoder can for example have a clock module generating a clock signal oscillating at a given clock frequency, the serial encoding circuit encoding the plurality of input signals into the headerless signal based on the clock signal.

Still further in accordance with the first aspect of the present disclosure, the serial decoding circuit of the traffic light controller can for example decode the headerless signal based on the clock signal.

Still further in accordance with the first aspect of the present disclosure, the time slots of the headerless signal can for example have a common period of time.

Still further in accordance with the first aspect of the present disclosure, the states of the plurality of input signals can for example be provided in the form of either a first binary value or a second binary value.

In accordance with a second aspect of the present disclosure, there is provided an electrical cabinet for a traffic signaling system, the electrical cabinet comprising: a housing; a traffic light controller within the housing, the traffic light controller having a serial encoding circuit serially encoding instructions associated with a plurality of output devices of the traffic signaling system into a headerless signal, the headerless signal beginning with a first time slot and ending with a last time slot temporally spaced apart from the first time slot, the time slots carrying the instructions associated with the plurality of output devices; and an output decoder within the housing and in communication with the traffic light controller, the output decoder having an input port receiving the headerless signal from the traffic light controller, a serial decoding circuit serially decoding the headerless signal to retrieve the instructions of the plurality of output devices carried by the time slots of the headerless signal, and a plurality of output ports outputting a plurality of output signals carrying the instructions associated with the plurality of output devices of the traffic signaling system for controlling thereof.

Further in accordance with the second aspect of the present disclosure, the serial encoding circuit can for example encode a plurality of temporally spaced apart intermediate time slots between the first and last time slots of the headerless signal, the first, intermediate and last time slots carrying the instructions of the plurality of output devices.

Still further in accordance with the second aspect of the present disclosure, the serial encoding circuit can for example encode the instructions to respective, predetermined time slots of the headerless signal in accordance to a predetermined association.

Still further in accordance with the second aspect of the present disclosure, the serial decoding circuit of the output decoder can for example associate the time slots of the headerless signal to respective, predetermined ones of the plurality of output devices in accordance with the predetermined association.

Still further in accordance with the second aspect of the present disclosure, the electrical cabinet can for example comprise at least a conductor connecting the traffic light controller and the output decoder to one another and via which the headerless signal is communicated.

Still further in accordance with the second aspect of the present disclosure, the electrical cabinet can for example comprise an electrical interface via which the traffic light controller and the output encoder are connected to one another.

Still further in accordance with the second aspect of the present disclosure, the traffic light controller can for example have a clock module generating a clock signal oscillating at a given clock frequency, the serial encoding circuit of the traffic light controller encoding the plurality of instructions into the headerless signal based on the clock signal.

Still further in accordance with the second aspect of the present disclosure, the serial decoding circuit of the output decoder can for example decode the headerless signal based on the clock signal.

Still further in accordance with the second aspect of the present disclosure, the time slots of the headerless signal can for example have a common period of time.

Still further in accordance with the second aspect of the present disclosure, the instructions associated with the plurality of output devices can for example be provided in the form of either a first binary value or a second binary value.

In accordance with a third aspect of the present disclosure, there is provided an input encoder having a plurality of input ports receiving a plurality of input signals carrying states associated with a plurality of input devices of a traffic signaling system, a serial encoding circuit serially encoding the states of the plurality of input signals into a headerless signal, the headerless signal beginning with a first time slot and ending with a last time slot temporally spaced apart from the first time slot, the time slots carrying the states of the plurality of input signals, and an output port outputting the headerless signal, the headerless signal being decodable to retrieve the states of the plurality of input signals.

In accordance with a fourth aspect of the present disclosure, there is provided an output decoder in communication with a traffic light controller, the output decoder having an input port receiving a headerless signal from the traffic light controller, a serial decoding circuit serially decoding the headerless signal to retrieve instructions of a plurality of output devices carried by the time slots of the headerless signal, and a plurality of output ports outputting a plurality of output signals carrying the instructions associated with the plurality of output devices of the traffic signaling system for controlling thereof.

Many further features and combinations thereof concerning the present improvements will appear to those skilled in the art following a reading of the instant disclosure.

DESCRIPTION OF THE FIGURES

In the figures,

FIG. 1A is a schematic view of the electrical cabinet of FIG. 1, showing an input encoder and a traffic light controller communicating with one another via a headerless signal, in accordance with one or more embodiments;

FIG. 1B is a schematic view of the electrical cabinet of FIG. 1, showing an output decoder and the traffic light controller of FIG. 1A communicating with one another via a headerless signal, in accordance with one or more embodiments;

DETAILED DESCRIPTION

Figure 1:
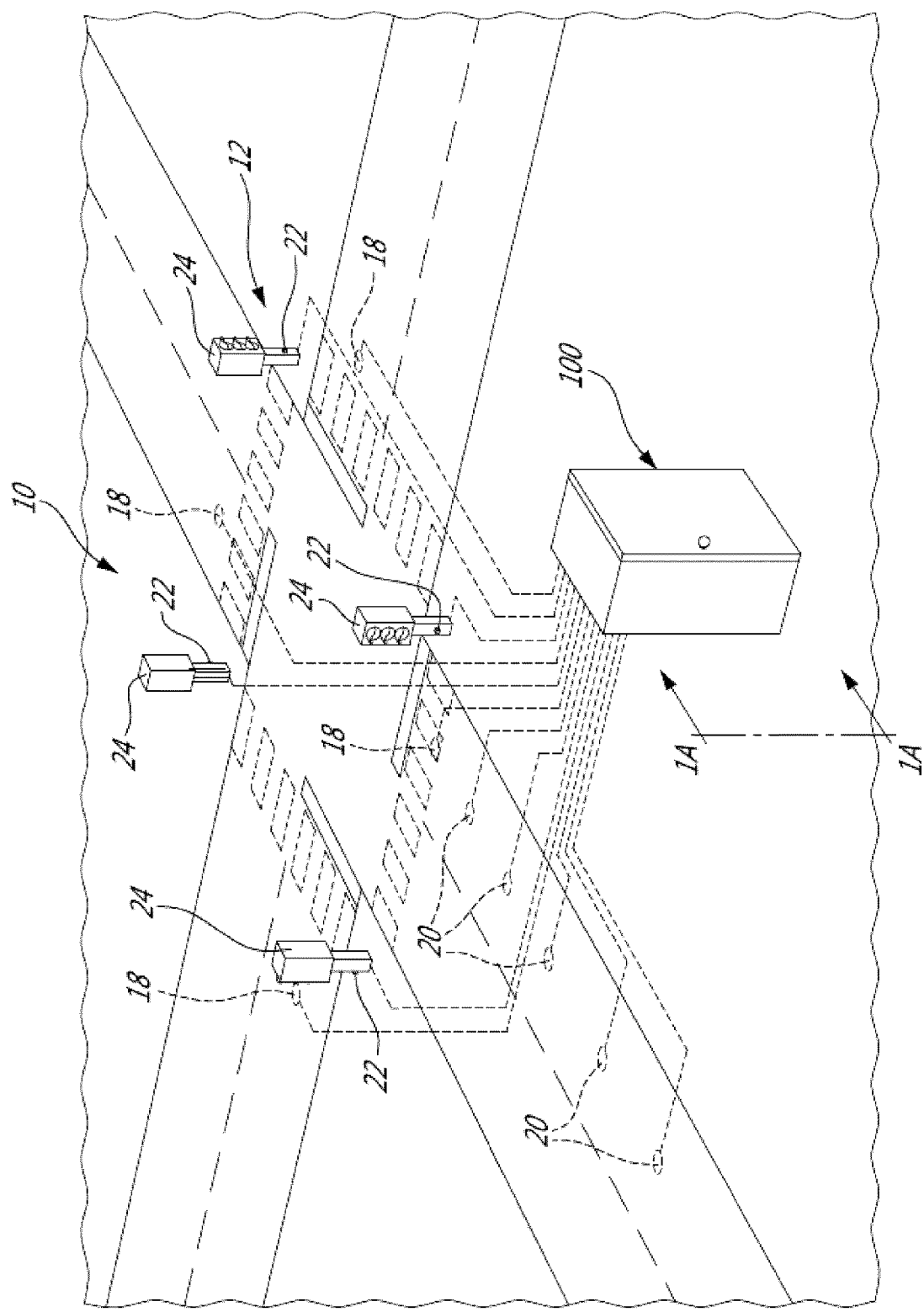
FIG. 1 is a schematic view of an example of a traffic signaling system, shown with an electrical cabinet having a traffic light controller therein, in accordance with one or more embodiments.

FIG. 1 shows an example of an electrical cabinet 100 for a traffic lighting system 10 which is located near a road intersection 12. In this specific example, the traffic signaling system 10 is controllable via a plurality of input signals, which may be received from the traffic signaling system 10, and via a plurality of output signals, which may be transmitted towards the traffic signaling system 10.

The input signals may be received from input devices. Examples of input devices can include, but are not limited to, vehicle sensor(s) 18 such as camera(s) and/or underground sensor(s), queue sensor(s) 20, pedestrian crossing button(s) 22, pre-emption module(s) and/or any other input device from which input signals can be received to control the traffic signaling system 10.

The output signals may be transmitted to output devices. Examples of output devices can include traffic light(s) 24, pedestrian crossing light(s), prepare-to-stop panels and/or any other output device towards which an output signal can be transmitted to control the traffic signaling system 10.

As can be understood, the pre-emption modules referred to above can include a railroad pre-emption module which is configured to modify the traffic signaling system 10 with the approach of a train at the road intersection 12. Bus and priority transport pre-emption modules can also be provided so as to modify the traffic signaling system 10 to coincide with the arrival of a bus or tram along a busway, bus lane, tramway or any other priority transportation means. There can also be emergency vehicles pre-emption modules which modify the traffic signaling system 10 in a way that such emergency vehicles experience only green lights, as light which may turn only amber and then red when fire trucks, ambulances, or other emergency vehicles or the like are exiting the station in direction to an emergency.

FIG. 1A shows a portion of the electrical cabinet 100 of FIG. 1. As shown, the electrical cabinet 100 has a housing 102, and an input encoder 104 and a traffic light controller 106 both housed within the housing 102.

In this example, the input encoder 104 has a plurality of input ports 106 receiving input signals carrying states associated with the input devices of the traffic signaling system 10. As shown, the input encoder 104 has a serial encoding circuit 108 encoding the states of the input signals into a headerless signal, and an output port 110 outputting the headerless signal.

Figure 2:
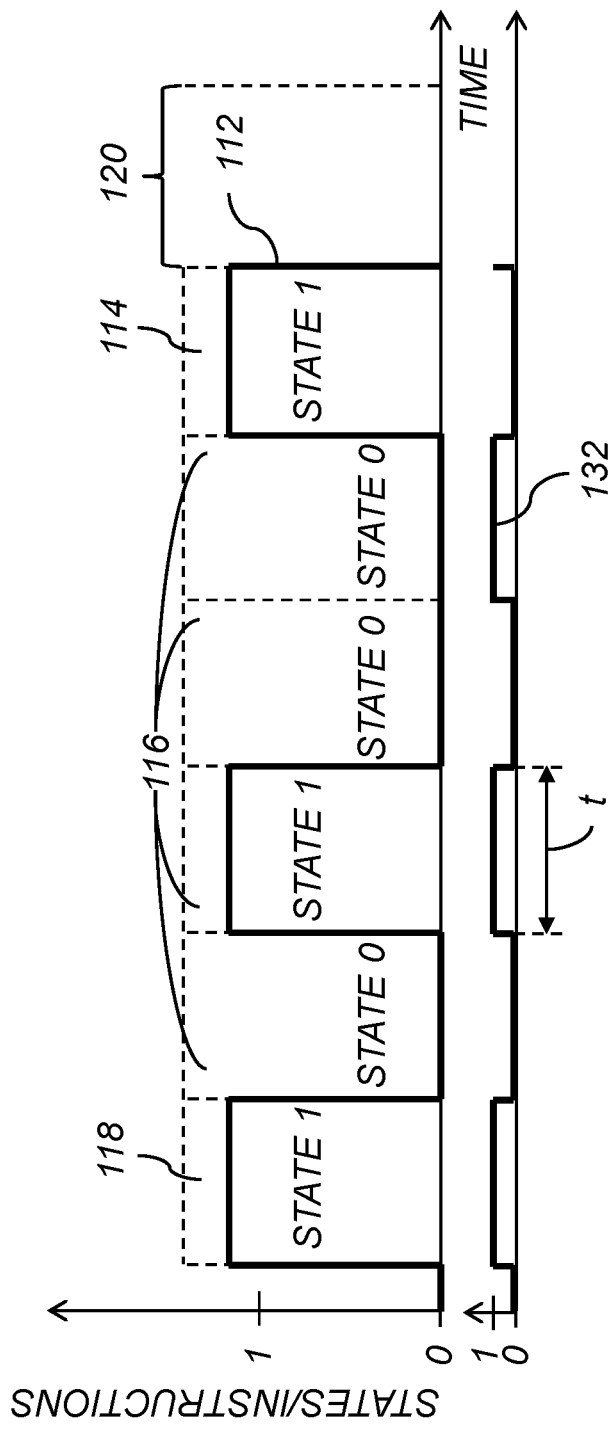
FIG. 2 is a graph showing amplitude as a function of time for an exemplary headerless signal used for communication within the electrical cabinet of FIG. 1, in accordance with one or more embodiments.

An example of the headerless signal is shown at 112 in FIG. 2. As depicted, the headerless signal 112 begins with a first time slot 114, has temporally spaced apart intermediate time slots 116, and ends with a last time slot 118. As shown in this example, the time slots 114, 116 and 118 are all temporally spaced apart from one another. Each of the time slots 114, 116 and 118 carries the state associated with a corresponding one of the input signals. In embodiments where there are only two input signals, the headerless signal 112 has only the first and last time slots, and the intermediate time slots are omitted.

As shown, prior to the first time slot 114, the headerless signal 112 has a headerless time slot 120 preceding the first time slot 114. The headerless time slot 120 carries no supplemental data such as state(s), address(es), predetermined association data and the like. As no header is present in the headerless signal, the communication between the input encoder 104 and the traffic light controller 106 can be simplified. Also shown in this specific example, the states of the input signals are provided in the form of either a first binary value (e.g., "0") or a second binary value (e.g., "1").

Referring back to FIG. 1A, the input encoder 104 is in communication with the traffic light controller 106. The communication between the input encoder 104 and the traffic light controller 106 can be a wired communication, such as the one shown, a wireless communication, or a combination thereof.

As shown, the traffic light controller 106 has a serial decoding circuit 122 receiving the headerless signal 112 from the input encoder 104. The serial decoding circuit 122 decodes the headerless signal 112 to retrieve the states of the input signals carried by the headerless signal 112.

As can be understood, the traffic light controller 106 controls the traffic signaling system 10 based on the retrieved states of the input signals, e.g., by processing the input signals as received from the headerless signal 112.

In this specific embodiment, when retrieved, the states of the input signals can be processed using a computing device 124 of the traffic light controller 106, which can then output signals having instructions to control the output devices of the traffic signaling system 10.

As shown in this example, the electrical cabinet 100 has one or more conductors 134 connecting the input encoder 104 and the traffic light controller 106 to one another and via which the headerless signal 112 is communicated.

In this embodiment, the conductors 134 have a headerless signal conductor 136 which connects the input encoder 104 and the traffic light controller 106 and via which the headerless signal 112 is communicated. Moreover, a clock signal conductor 138 connects the input encoder 104 to the traffic light controller 106. In this example, the clock signal 132 is communicated via the clock signal conductor 138.

In some embodiments, the electrical cabinet 100 has an electrical interface via which the input encoder 104 and the traffic light controller 106 are connected to one another. An example of such electrical interface is shown and described with reference to FIG. 4 below.

In this specific embodiment, the serial encoding circuit 108 encodes the input signals to respective, predetermined time slots of the headerless signal 112 in accordance to a predetermined association.

For instance, the predetermined association can be provided in the form of a table specifying that a first one of the input signals is encoded to the first time slot 114, a second one of the input signals is encoded to a first one of the intermediate time slots 116, and so forth, until the last one of the input signals is encoded to the last time slot 118. The predetermined association can be implemented in the serial encoding circuit 108 as a combination of hardware and/or software. An example of such predetermined association is provided in Table 1.

TABLE 1

Predetermined association between the input devices and the time slots

| Input device | Input signal | Time slot |
| --- | --- | --- |
| First one of the vehicle sensors 18 | #1 | First time slot 114 |
| First one of the queue sensors 20 | #2 | First one of the intermediate time slots 116 |

TABLE 1-continued

Predetermined association between
the input devices and the time slots

| Input device | Input signal | Time slot |
| --- | --- | --- |
| First one of the pedestrian crossing buttons 22 | #3 | Second one of the intermediate time slots 116 |
| First one of the pre-emption modules | #4 | Third one of the intermediate time slots 116 |
| . . . | . . . | . . . |
| Other one of the input devices | #N | Last time slot 118 |

Accordingly, the serial decoding circuit 122 of the traffic light controller 106 associates the time slots 114, 116 and 118 of the headerless signal 112 to respective, predetermined ones of the plurality of input signals in accordance with the predetermined association.

For instance, based on the above table, the serial decoding circuit 122 can associate the first time slot 114 to the first one of the input signals, which corresponds in this case to the first one of the vehicle sensors 18 of the traffic signaling system 10, the first one of the intermediate time slots 116 to the second one of the input signals, which corresponds in this case to the first one of the queue sensors 20, and so forth, until the last time slot 118 is associated with the $N^{th}$ one of the input signals. N corresponds to a positive integer in this example, and can be as great as the number of the input devices of the traffic signaling system 10 in this example.

As shown, the input encoder 104 has a clock module 130 generating a clock signal, with which the serial encoding circuit 108 encodes the input signals into the headerless signal 112. An example of the clock signal is shown at 132 in FIG. 2. The clock signal 132 oscillates at a given clock frequency f. The time slots 114, 116 and 118 can last for one or more periods T (=1/f) of the clock signal 132. In the illustrated example, the time slots 114, 116 and 118 of the headerless signal 112 have a common period of time, which corresponds to the period T of the clock signal 132.

FIG. 1B shows another portion of the electric cabinet 100. As depicted, the electrical cabinet 100 has the traffic light controller 106 and an output decoder 140 both housed within the housing 102.

In this example, the traffic light controller 106 has a serial encoding circuit 142 encoding instructions associated with the output devices of the traffic signaling system 10 into a headerless signal, such as the one shown at 112 in FIG. 2. The headerless signal encoded by the serial encoding circuit 142 of the traffic light controller 106 is similar to the headerless signal encoded by the serial encoding circuit 108 of the input encoder 104 described with reference to FIG. 1A. However, in this embodiment, each one of the slots 114, 116 and 118 of the headerless signal 112 encoded by the serial encoding circuit 142 of the traffic light controller 106 carries the instruction associated with a corresponding one of the output devices of the traffic signaling system 10.

In this specific embodiment, when the computing device 124 has processed the input signals as received from the input encoder 104, the computing device 124 outputs output signals having instructions to control the output devices of the traffic signaling system 10. These output signals are encoded to one another in the headerless signal 112 by the serial encoding circuit 142.

More specifically, the output decoder 140 has an input port 144 receiving the headerless signal 112 from the traffic light controller 106, a serial decoding circuit 146 decoding the headerless signal 112 to retrieve the instructions of the output devices carried by the time slots 114, 116 and 118 of the headerless signal 112, and output ports 148 outputting output signals carrying the instructions for the output devices of the traffic signaling system 10 in order to control it.

Again, the electrical cabinet 100 has one or more conductors 152 connecting the traffic light controller 106 to the output decoder 140. More specifically, in the illustrated embodiment, the conductors 152 has a headerless signal conductor 154 and a clock signal conductor 156 both connecting the traffic light controller 106 and the output decoder 140 to one another and via which the headerless signal 112 and the clock signal 132 are communicated.

In this example, the serial encoding circuit 142 encodes the instructions to respective, predetermined ones of the time slots 114, 116 and 118 of the headerless signal 112 in accordance to a predetermined association.

For instance, the predetermined association can be provided in the form of a table specifying that a first one of the instructions is encoded to the first time slot 114, a second one of the instructions is encoded to a first one of the intermediate time slots 116, and so forth, until the last one of the instructions is encoded to the last time slot 118. The predetermined association can be implemented in the serial encoding circuit 142 as a combination of hardware and/or software. An example of such predetermined association is provided in Table 2.

TABLE 2

Predetermined association between
the output devices and time slots

| Output device | Instructions | Time slot |
| --- | --- | --- |
| First one of the traffic lights 24 | #1 | First time slot 114 |
| First one of the pedestrian crossing lights | #2 | First one of the intermediate time slots 116 |
| First one of the prepare-to-stop panels | #3 | Second one of the intermediate time slots 116 |
| . . . | . . . | . . . |
| Other one of the output devices | #N | Last time slot 118 |

Accordingly, the serial decoding circuit 146 of the output decoder associates the time slots 114, 116 and 118 of the headerless signal 112 to respective, predetermined ones of the plurality of output devices of the traffic signaling system 10 in accordance with the predetermined association.

For instance, based on the above table, the serial decoding circuit 146 can associate the first time slot 114 to the first one of the instructions, which corresponds in this case to the first one of the traffic lights 24 of the traffic signaling system 10, the first one of the intermediate time slots 116 to the second one of instructions, which corresponds in this case to the first one of the pedestrian crossings, and so forth, until the last time slot 118 is associated with the $N^{th}$ one of the instructions. N corresponds to a positive integer in this example, and is as great as the number of the output devices of the traffic signaling system 10 in this example.

In this specific example, the traffic light controller has a clock module 150 generating a clock signal, such as the one shown in FIG. 2, based on which the serial encoding circuit 142 encodes the instructions into the headerless signal 112. In this embodiment, the serial decoding circuit 146 of the output decoder 140 decodes the headerless signal 112 based on the clock signal 132. The clock modules 130 and 150 can be two different clock modules which may be synchronized to one another in some embodiments. In some other embodiments, the clock modules 130 and 150 are distinct from one another and their corresponding clock signals are not in sync. In alternate embodiments, the clock modules 130 and 150 can be provided in the form of a single clock module, shared between the input encoder 104, the traffic light controller 106 and the output decoder 140.

Figure 3:
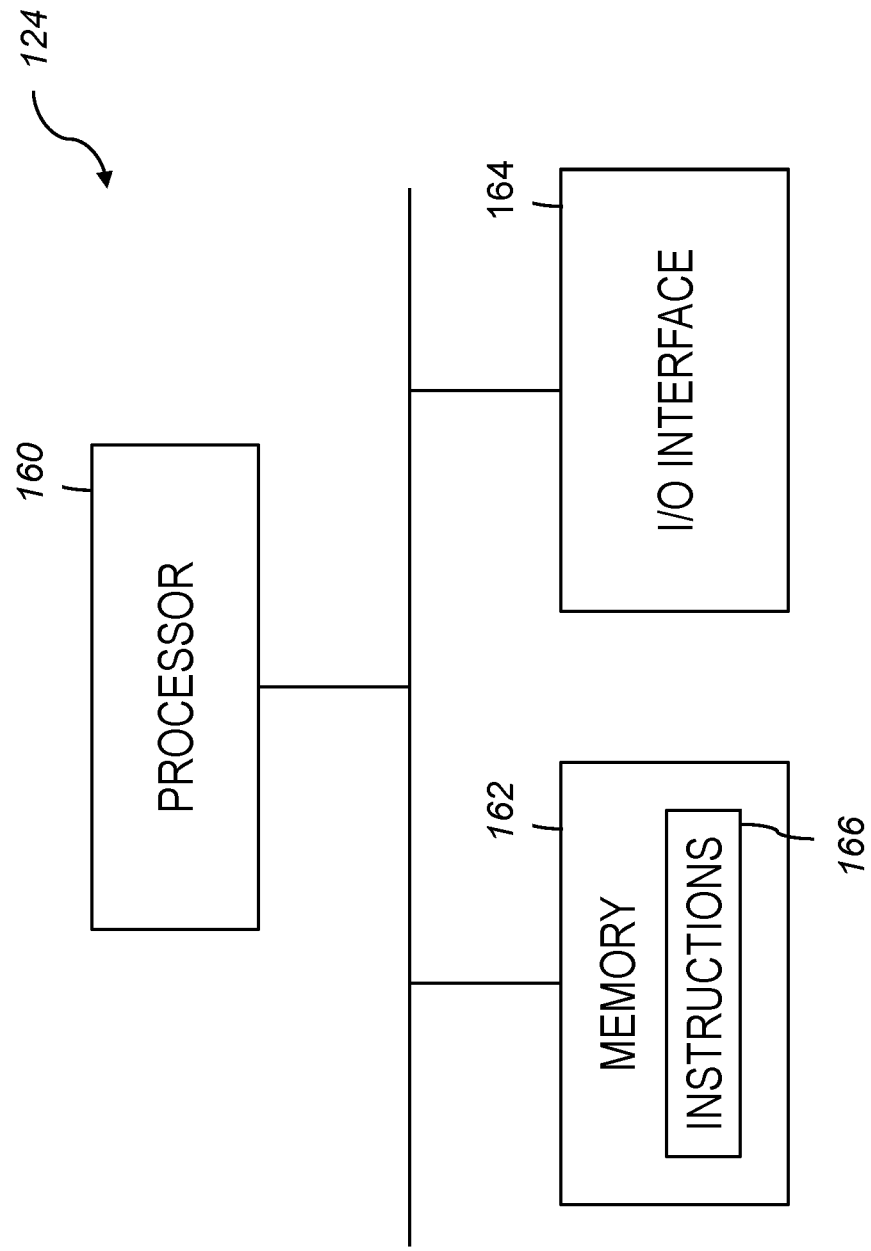
FIG. 3 is a schematic view of an example of a computing device of the traffic light controller of FIG. 1, in accordance with one or more embodiments.

Referring to FIG. 3, the computing device 124 can have a processor 160, a memory 162, and I/O interface 164. Instructions 166 for controlling the traffic signaling system 10 can be stored on the memory 162 and accessible by the processor 160. For instance, such instructions may be based on predetermined sequences, durations, traffic hours or traffic days as would be apparent for the skilled reader.

The processor 160 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 162 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

In this embodiment, each I/O interface 164 enables the computing device 124 to interconnect with the input devices and with the output devices of the traffic signaling system 10.

In this embodiment, each I/O interface 164 enables the traffic light controller 106 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The computing device 124 is meant to be examples only. Other suitable embodiments of the traffic light controller 106 can also be provided, as it will be apparent to the skilled reader.

Figure 4:
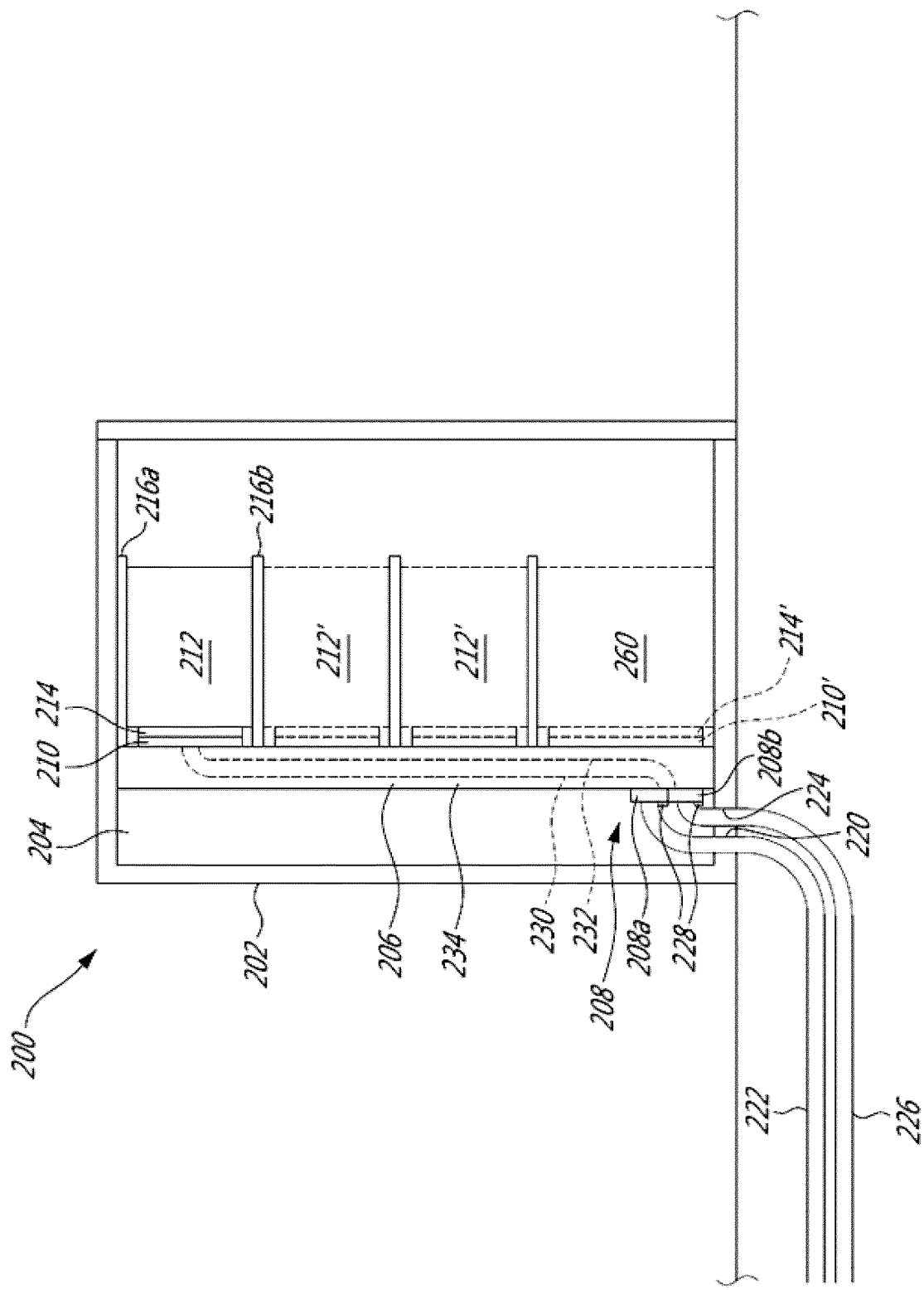
FIG. 4 is a sectional view of another example of an electrical cabinet for a traffic signaling system, in accordance with one or more embodiments.

FIG. 4 shows another example of an electrical cabinet 200. As shown, the electrical cabinet 200 has a housing 202 defining a cavity 204, and an electrical interface 206 housed within the cavity 204. The electrical interface 206 has a port 208 being connected to the traffic signaling system 10 during use, and an edge connector 210 being connected to the port 208. As depicted, the electrical interface 206 has a traffic light controller 206 with an edge connector 214 which is connectively received in the edge connector 210 of the electrical interface 206, thereby maintaining the traffic light controller 206 in position once received. As can be understood, the traffic light controller 206 is configured for controlling the traffic signaling system. More specifically, the traffic light controller 206 can be configured to receive, via the port 208, the input signals from the traffic signaling system 10 and for transmitting, also via the port 208, the output signals to the traffic signaling system 10.

In this embodiment, the edge connector 210 is a female edge connector (hereinafter "female edge connector 210") and the edge connector 214 is a male edge connector (hereinafter "male edge connector 214"). Accordingly, the male edge connector 214 of the traffic light controller 206 is connectively received in the female edge connector 210 of the electrical interface 206. In this example, the edge connectors 210 and 214 are provided in the form of EDAC® edge connectors. However, any other suitable edge connectors could have alternatively been used including, but not limited to, card edge connectors and the like.

For instance, in embodiments where the traffic light controller 206 is provided in the form of a printed circuit board (PCB), the male edge connector 214 of the traffic light controller 206 can be a card edge connector. In such embodiments, the male edge connector 214 includes an edge of the PCB and conductive traces leading up to that edge.

In this example, the edge connector 214 is slidably received in the edge connector 210. For instance, the electrical interface 206 has two spaced apart parallel runners 216a and 216b extending perpendicularly from the electrical interface 206. As illustrated, each runner 216a, 216b is mounted adjacent to the edge connector 110 of the electrical interface 206. Accordingly, the traffic light controller 206 is correspondingly provided in the form of a plug-in drawer which is slidably received between the two spaced apart parallel runners 216a and 216b, for guiding the connection between the edge connectors 210 and 214.

In some other embodiments, the electrical interface 206 can have less than two or more than two runners protruding from the electrical interface 206 and along which the traffic light controller 206 can be slidably received. In further embodiments, the housing 202 can have one or more tablets on which the traffic light controller 206 may slide, or rest upon, prior to or upon connection between the edge connectors 210 and 214.

As can be understood, the port 208 and the traffic signaling system 10 can be connected to the port 208 via a wired connection, a wireless connection, or a combination of both. More specifically, in this example, the housing 202 has an input opening 220 that sealingly receives an input cable 222 carrying input signals and an output opening 224 that sealingly receives an output cable 226 carrying output signals. As such, in this example, the port 208 includes an input port 208a and an output port 208b which are each connected to a respective input cable 222 and output cable 226 via corresponding connectors 228. In alternate embodiments, the housing 202 can have a single opening sealingly receiving both the input and output cables 222 and 226. Alternately, the input and output signals can be carried via a single cable in some other embodiments.

As illustrated, the electrical interface 206 has input conductors 230 extending between the input port 208a and the edge connector 210 of the electrical interface 206. Similarly, the electrical interface 206 has output conductors 232 extending between the output port 208b and the edge connector 210 of the electrical interface 206. Accordingly, in this embodiment, the traffic light controller 206 is connected to the traffic signaling system 10 via cables 222 and 224, conductors 230, 232, ports 208a and 208b, and edge connectors 210 and 214. As shown, the input conductors 230 and the output conductors 232 can at least partially extend within, or run along, a panel body of the electrical interface 206.

In this example, the traffic light controller 206 is provided in the form of one or more analog circuit boards which can have card edge connectors suited for electrical connection to the edge connector 210 of the electrical interface 206.

It was found convenient to provide the electrical interface 206 in the form of a panel body 234 which extends vertically within the cavity 204 of the housing 202. More specifically, the panel body 234 can be abutted to or spaced apart from an interior surface of one of the lateral walls of the housing 202. The panel body 234 can face a door of the electrical cabinet 100.

In the illustrated embodiment, the electrical interface 206 has one or more other edge connectors 210' which are configured to connectively receive one or more other electrical components 212' via corresponding edge connectors 214'. Examples of such other electrical components can include, but are not limited to, a main power supply, a secondary power supply, communication port(s), a graphical user interface, and the like. In this way, the connection between the other electrical components 212' and the electrical interface 206 can be facilitated as well, thereby further reducing the amount of wire harnesses required inside the electrical cabinet 200.

In such embodiments, the edge connectors 210 and 210' of the electrical interface 206 can be positioned in a vertically extending array so that the traffic light controller 206 and the electrical components 212' can lie parallel to a vertical plane of the electrical cabinet 200 when connected thereto, laterally- or vertically-stacked relative to one another.

In some embodiments, the traffic light controller 212 may also be configured to perform auxiliary functions, which do not directly relate to the control of the traffic signaling system 10. Examples of such auxiliary functions can include, but are not limited to, performing a diagnostic test on the traffic light controller 206, collecting data relative to the traffic light controller 206, displaying data on a monitor inside the electrical cabinet 200, receiving data from one or more remote sensors external to the traffic signaling system 10 such as from autonomous vehicles, communicating data to one or more remote systems, storing data on one or more memories and similar data processing steps.

For instance, in a further aspect, it was found that electrical cabinets, such as the electrical cabinet 100, in which the traffic light controller 106 was used both for controlling the traffic signaling system 10 and for performing such auxiliary tasks could drain a significant computational power of the traffic light controller 106, which could then lead to delays and/or failures in the control of the traffic signaling system 10. There was thus a need in the industry for limiting such delays and/or failures in the control of the traffic signaling system 10.

As shown in FIG. 4, it was found convenient to provide an auxiliary controller 260 inside the housing 204 of the electrical cabinet 200. More specifically, although the auxiliary controller 260 can be connected to the traffic light controller 212, the auxiliary controller 260 is computationally independent from the traffic light controller 212. In other words, when the auxiliary controller 260 performs one or more of the auxiliary tasks, the traffic light controller is not or almost not computationally solicited. As such, the auxiliary controller 260 is configured for performing auxiliary functions, such as the ones described above, which do not affect the controlling of the traffic signaling system 10 by the traffic light controller 212. In this way, the traffic light controller 212 can be used solely for tasks having regards to controlling the traffic signaling system 10, and not for non-critical, auxiliary tasks.

Still in these embodiments, it was found preferable to provide the traffic light controller 212 and the auxiliary controller 260 in the form of separate printed circuit boards, which are nonetheless connected to one another. For instance, both the traffic light controller 212 and the auxiliary controller 260 can be connected to an electrical interface 206 via corresponding edge connectors 210 and 214. Accordingly, the traffic light controller 212 and the auxiliary controller 260 can be connected to one another via the electrical interface 206. The illustrated example shows that both the light controller 212 and the auxiliary controller 260 extend parallel to a vertical plane of the electrical cabinet 200.

Figure 4A:
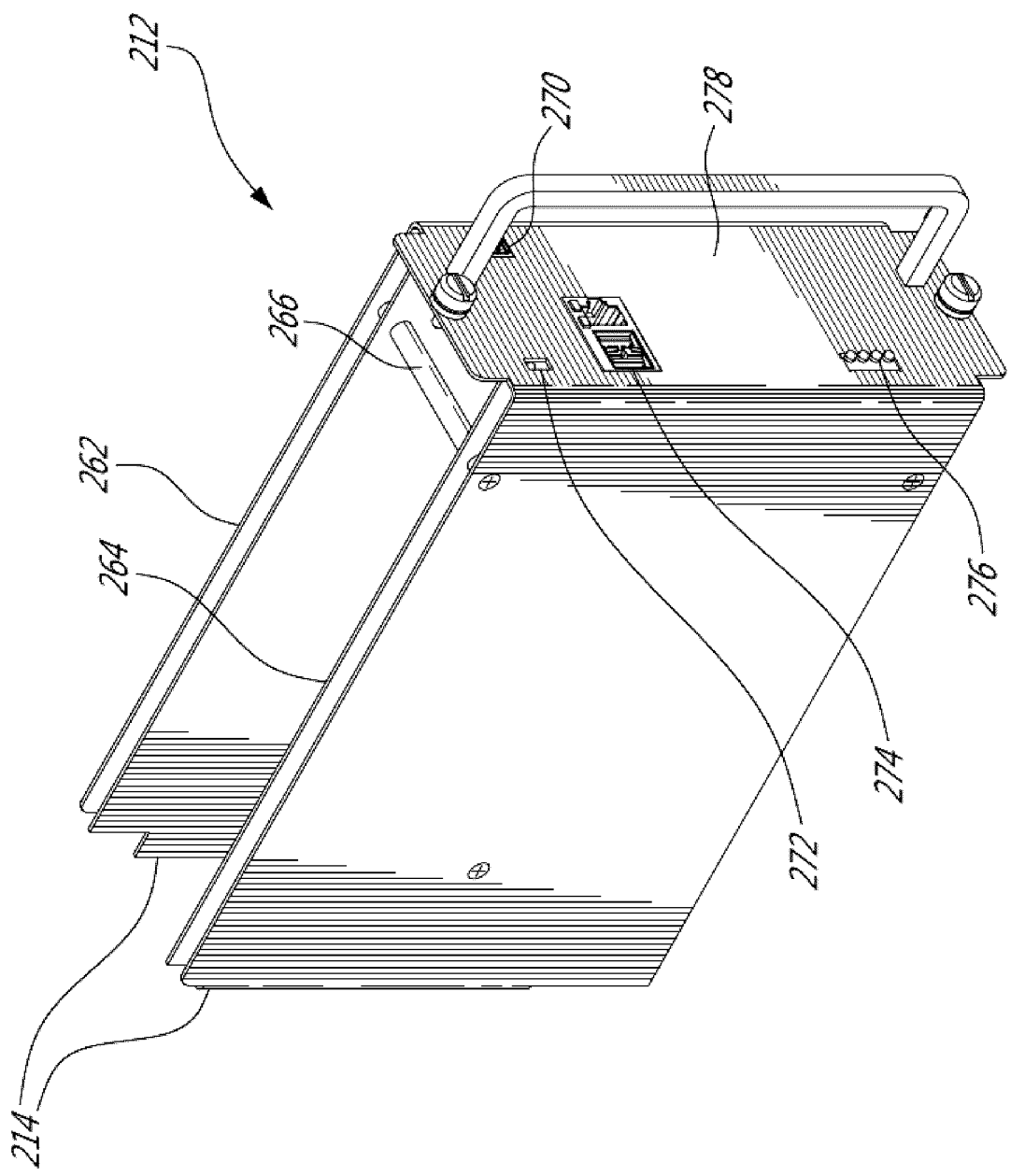
FIG. 4A is an oblique view of an example of the traffic light controller of FIG. 4, shown with two sister circuits connected to one another, in accordance with one or more embodiments.

FIG. 4A is an example of the traffic light controller 212, in accordance with one or more embodiments. As depicted, the traffic light controller 212 has first and second sister circuits 262 and 264 which are connected to one another. The first and second sister circuits 262 and 264 are connected to the electrical interface 206 via edge connectors 210.

As shown in this example, the first and second sister circuits 262 and 264 can be connected to one another via pin header connectors 266. However, in other embodiments, the first and second sister circuits 262 and 264 can be connected to one another via ribbon wires. Other types of connection may appear suitable for the skilled reader.

The traffic light controller 212 can be dedicated to essential tasks pertaining to the control of the traffic signaling system 10. More specifically, in this example, the first sister circuit 262 is configured to receive input signals from the traffic signaling system 10 and to transmit output signals to the traffic signaling system 10. However, the second sister circuit 264 is configured to receive the input signals from the first sister circuit 262, to process them using a computing device, and to transmit the output signals towards the first sister circuit 262, which are then used for controlling the traffic signaling system 10.

In other words, the first sister circuit 262 acts as an interface between the input devices and the output devices of the traffic signaling system 10 whereas the second sister circuit 264 acts as a computing device which processes the input signals received from the first sister circuit 262 and transmits the output signals to the first sister circuit 262 to ultimately control said traffic signaling system 10. As such, the first sister circuit 262 can have input interfaces for receiving the input signals from the input devices and output interfaces for transmitting output signals to the output devices of the traffic signaling system 10. The communication occurring between the first and second sister circuits 262 and 264 can be performed in accordance with the above-mentioned systems and methods and involves headerless signal(s).

Figure 4B:
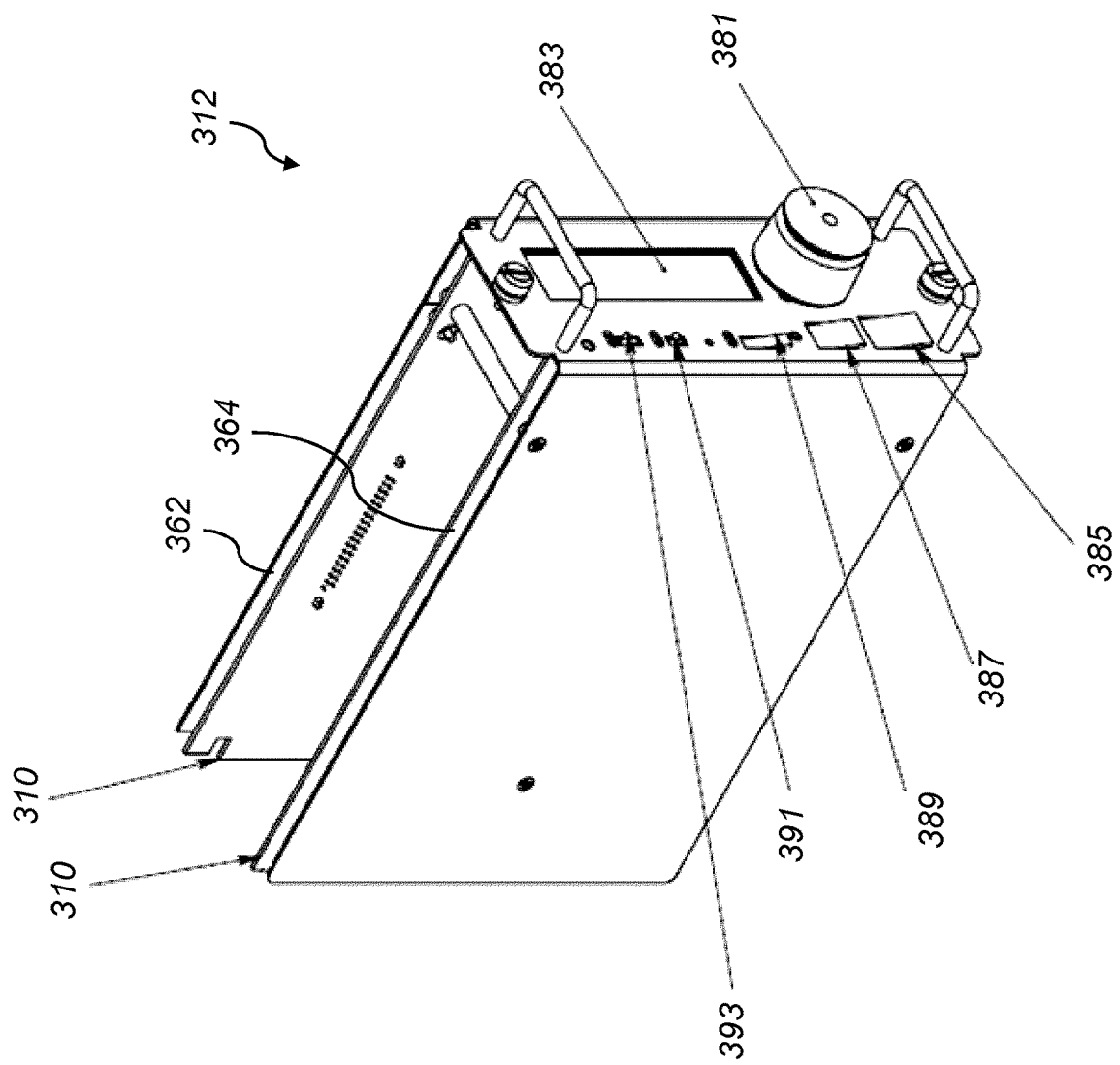
FIG. 4B is an oblique view of another example of a traffic light controller having two sister circuits connected to one another, in accordance with one or more embodiments.

FIG. 4B is another example of a traffic light controller 312, in accordance with one or more embodiments. As depicted, the traffic light controller 312 has first and second sister circuits 362 and 364 which are connected to one another. The first and second sister circuits 362 and 364 are connected to the electrical interface 306 via edge connectors 310. As shown in this embodiment, the traffic light controller 312 has a plurality of interfaces allowing interaction with the first and second sister circuits 362 and 364. As depicted, the traffic light controller 312 has a multifunction mouse 381, a display 383, an Ethernet/Internet Port RJ45 385, a slave USB port 387, a master USB port 389, a first switch 391 to turn down the operation of the traffic light controller 312, and a second switch 393 to turn down the power supply powering the traffic light controller 312, to name a few examples.

Figure 5:
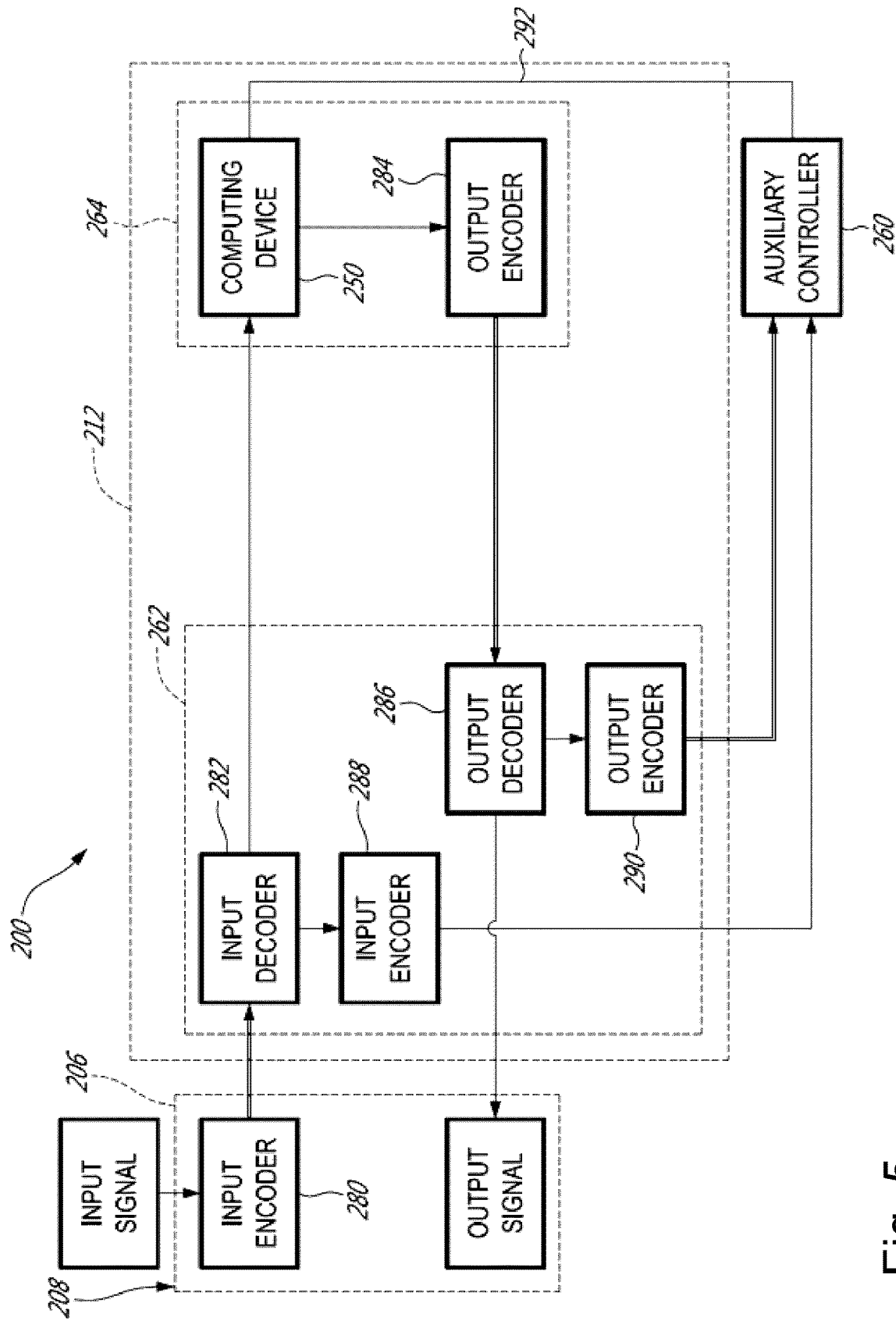
FIG. 5 is a block diagram representing serial communications occurring inside the electrical cabinet of FIG. 4, in accordance with one or more embodiments.

FIG. 5 is a block diagram showing an embodiment in which the input and output signals are serialized through hardware and software for communication within the electrical cabinet 200. As depicted, the electrical interface 206 receives the input signals and transmits the output signals at port 208. It was found that such serial communication can reduce the amount of required signal lines for communicating input and output signals inside the electrical cabinet 200, and thus reduce the cost.

More specifically, in this example, the communication between the input encoder 280 and the input decoder 282 of the traffic light controller 212 is performed via a headerless signal such as described with reference to the electrical cabinet 100 above. Similarly, the communication between the output decoder 284 and the output decoder 286 can also be performed via a headerless signal such as described above. Moreover, the communication between the output encoder 290 and the auxiliary controller 260 can also be performed via a headerless signal such as described above. Accordingly, in FIG. 5, the double lines shows communication links via which the communication is assured via one or more headerless signals, free from headers generally required in known communication protocols.

Once connected, the input signals incoming from the traffic lighting system 10 are serially encoded with an input encoder 280 and then transmitted towards the first sister circuit 262 of the traffic light controller 212. At the first sister circuit 262, the encoded input signals are decoded using input decoder 282 and then transmitted towards the second sister circuit 264. At the second sister circuit 264, the decoded input signals are processed by a computing device 250 which produces output signals that are then transmitted to an output encoder 284 also lying on the second sister circuit 264 in this example. As briefly mentioned above, the computing device 250 may be similar to the one described with reference to FIG. 2. The output encoder 284 serially encodes the output signals and transmits them to an output decoder 286 of the first sister circuit 262. Once decoded, the output signals may be transmitted to the output devices of the traffic lighting system 10. As illustrated, each output signal transmitted is wired through a dedicated output conductor (e.g., a pin) on the electrical interface 206, to control one or more components of the traffic lighting system 10.

In this specific example, the first sister circuit 262 has an input encoder 288 for serially encoding the input signals received from the input decoder 282 and for transmitting the encoded input signals to the auxiliary controller 260 to perform auxiliary functions such as diagnostic functions. The first sister circuit 262 also has an output encoder 290 for serially encoding the output signals received from the output decoder 286 and for transmitting the encoded output signals to the auxiliary controller 260 for diagnostic purposes, for instance. As shown, the computing device 250 may transmit the output signals directly towards the auxiliary controller 260 via a wired connection 292 in this example.

The skilled reader will understand that the configuration shown and described with reference to FIG. 4A is an example only, as other embodiments may also be used.

Referring back to FIG. 4A, the first sister circuit 262 can have a positive direct current voltage (VDC) port, a ground (GND) voltage port, one or more video HDMI output connectors 270, one or more touch screen connectors and can hold the pin header connectors 266 which interface with the second sister circuit 264.

The second sister circuit 264 can have an off/on switch 272, one or more communication ports 274 from which encoded input signals and/or output signals can be transmitted towards the auxiliary controller 260 via the electrical interface 206 and the corresponding edge connectors.

The second sister circuit 264 can also have a set of status indicators 276 mounted to a front plate 278 thereof to show a current status of the traffic light controller 212. The second sister circuit 264 can have one or more HDMI interfaces forwarded through the pin header connector to the first sister circuit 262.

The second sister circuit 264 can incorporate a pluggable GPS module with antenna connector mounted onto the front panel 278 in some embodiments. The second sister circuit 264 can have a port selector configured to allow redirection of its first communication port (i.e. the C2 port) to either a first modem location, a USD/DB9 front panel connector, a LAN Ethernet RJ45 front connector or through the electrical interface 206 via the corresponding edge connectors towards the auxiliary controller 260.

A USB connector or otherwise any data connector can be incorporated in the front panel 278 to locally upgrade and push/pull bios to/from the computing device of the second sister board 264 or from a remote device. A communication link such as a RS485 link can also be routed through the edge connector to carry diagnostic information towards the auxiliary controller 260.

Figure 6:
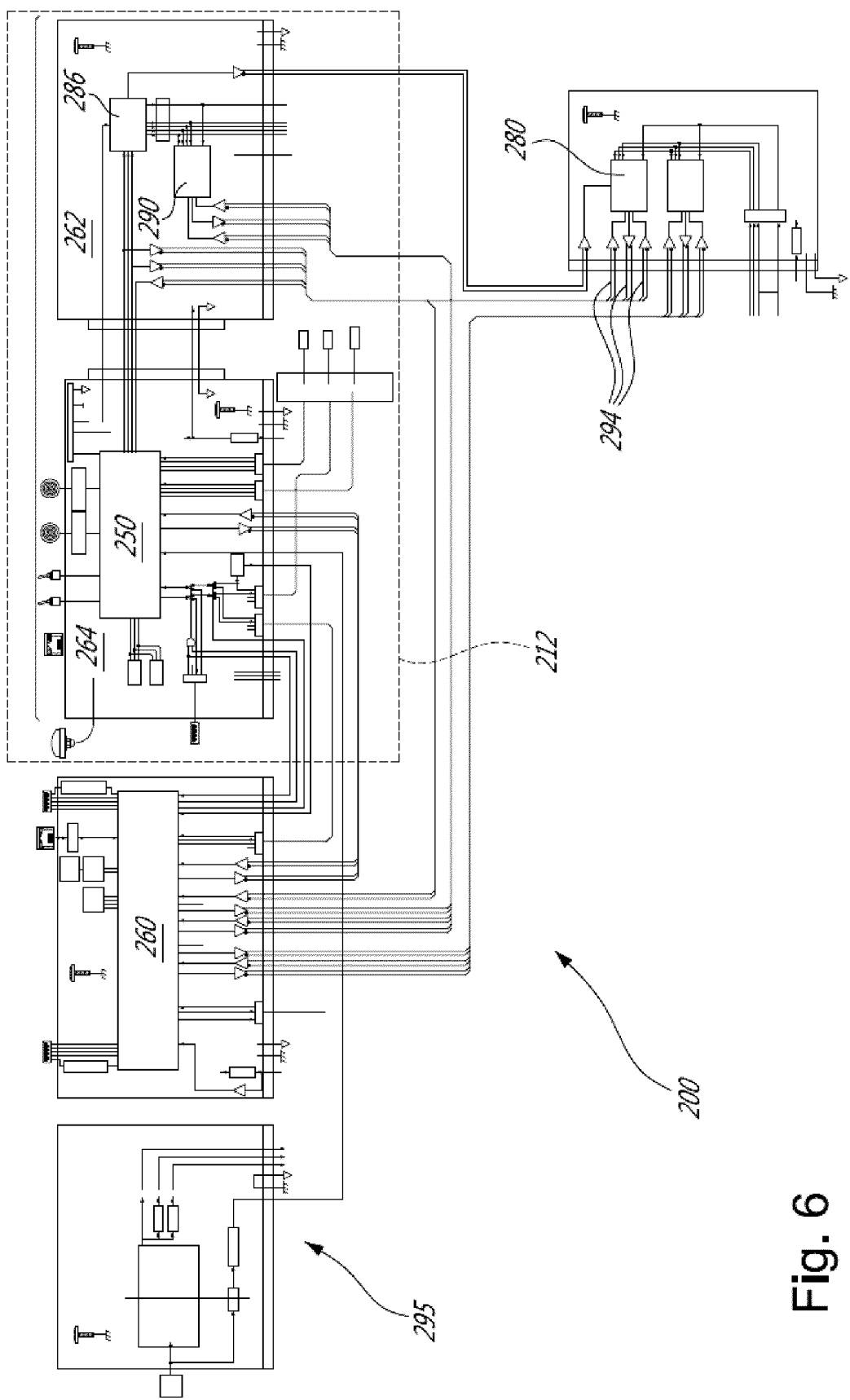
FIG. 6 is a block diagram showing components and connections housed within the electrical cabinet of FIG. 4, in accordance with one or more embodiments.

FIG. 6 shows a detailed embodiment of the electrical housing 200. As depicted, in this example, the traffic light controller 212 and the auxiliary controller 260 are powered by a power supply board 295. The traffic light controller 212 incorporates the first and second sister boards 262 and 264 which communicate with one another using headerless signal(s) as disclosed herein. More specifically, the output decoder 286 of the first sister board 262 communicates with the computer device 250 of the second sister board 264 via headerless signals. The input encoder 280 serially encodes the input signals to three signals, a clock signal, a headerless signal and a latch enable (LE) signal independent from the bus width.

As shown, each of the three signals has a corresponding pair of conductors 294 in order to reduce electrical noise coupling effect. Such a configuration can also be used to minimize radiated emissions for these three digital signals. The first sister circuit 262 also has an output encoder 290 for serially encoding the output signals received from the output decoder 286, as shown. In this specific embodiment, the required I/O response time can be quite slow. Accordingly, a clock with a speed in the kilohertz range was found to be acceptable. Discrete parts could be used to serialize the input and output signals, however, a low-cost small complex programmable logic device (CPLD) could also be used at each end thus integrating the complete circuit.

As can be understood, the examples described above and illustrated are intended to be exemplary only. The scope is indicated by the appended claims.

What is claimed is:

1. An electrical cabinet for a traffic signaling system, the electrical cabinet comprising:
  a housing;
  an input encoder within the housing, the input encoder having a plurality of input ports receiving a plurality of input signals carrying states associated with a plurality of input devices of the traffic signaling system, a serial encoding circuit serially encoding the states of the plurality of input signals into a headerless signal, the headerless signal beginning with a first time slot and ending with a last time slot temporally spaced apart from the first time slot, the time slots carrying the states of the plurality of input signals, and an output port outputting the headerless signal; and a traffic light controller within the housing and in communication with the input encoder, the traffic light controller having a serial decoding circuit receiving the headerless signal and serially decoding the headerless signal to retrieve the states of the plurality of input signals carried by the time slots of the headerless signal, the traffic light controller controlling the traffic signaling system based on the retrieved states associated with the plurality of input devices of the traffic signaling system.

2. The electrical cabinet of claim 1, wherein the serial encoding circuit encodes a plurality of temporally spaced apart intermediate time slots between the first and last time slots of the headerless signal, the first, intermediate and last time slots carrying the states of the plurality of input signals.

3. The electrical cabinet of claim 1, wherein the serial encoding circuit encodes the plurality of input signals to respective, predetermined time slots of the headerless signal in accordance to a predetermined association.

4. The electrical cabinet of claim 3, wherein the serial decoding circuit of the traffic light controller associates the time slots of the headerless signal to respective, predetermined ones of the plurality of input signals in accordance with the predetermined association.

5. The electrical cabinet of claim 1, further comprising at least a conductor connecting the input encoder and the traffic light controller to one another and via which the headerless signal is communicated.

6. The electrical cabinet of claim 1, further comprising an electrical interface via which the input encoder and the traffic light controller are connected to one another.

7. The electrical cabinet of claim 1, wherein the input encoder has a clock module generating a clock signal oscillating at a given clock frequency, the serial encoding circuit encoding the plurality of input signals into the headerless signal based on the clock signal.

8. The electrical cabinet of claim 7, wherein the serial decoding circuit of the traffic light controller decodes the headerless signal based on the clock signal.

9. The electrical cabinet of claim 1, wherein the time slots of the headerless signal have a common period of time.

10. The electrical cabinet of claim 1, wherein the states of the plurality of input signals are provided in the form of either a first binary value or a second binary value.

11. An electrical cabinet for a traffic signaling system, the electrical cabinet comprising:
a housing;
a traffic light controller within the housing, the traffic light controller having a serial encoding circuit serially encoding instructions associated with a plurality of output devices of the traffic signaling system into a headerless signal, the headerless signal beginning with a first time slot and ending with a last time slot temporally spaced apart from the first time slot, the time slots carrying the instructions associated with the plurality of output devices; and an output decoder within the housing and in communication with the traffic light controller, the output decoder having an input port receiving the headerless signal from the traffic light controller, a serial decoding circuit serially decoding the headerless signal to retrieve the instructions of the plurality of output devices carried by the time slots of the headerless signal, and a plurality of output ports outputting a plurality of output signals carrying the instructions associated with the plurality of output devices of the traffic signaling system for controlling thereof.

12. The electrical cabinet of claim 11, wherein the serial encoding circuit encodes a plurality of temporally spaced apart intermediate time slots between the first and last time slots of the headerless signal, the first, intermediate and last time slots carrying the instructions of the plurality of output devices.

13. The electrical cabinet of claim 11, wherein the serial encoding circuit encodes the instructions to respective, predetermined time slots of the headerless signal in accordance to a predetermined association.

14. The electrical cabinet of claim 13, wherein the serial decoding circuit of the output decoder associates the time slots of the headerless signal to respective, predetermined ones of the plurality of output devices in accordance with the predetermined association.

15. The electrical cabinet of claim 11, further comprising at least a conductor connecting the traffic light controller and the output decoder to one another and via which the headerless signal is communicated.

16. The electrical cabinet of claim 11, further comprising an electrical interface via which the traffic light controller and the output encoder are connected to one another.

17. The electrical cabinet of claim 11, wherein the traffic light controller has a clock module generating a clock signal oscillating at a given clock frequency, the serial encoding circuit of the traffic light controller encoding the plurality of instructions into the headerless signal based on the clock signal.

18. The electrical cabinet of claim 17, wherein the serial decoding circuit of the output decoder decodes the headerless signal based on the clock signal.

19. The electrical cabinet of claim 11, wherein the time slots of the headerless signal have a common period of time.

20. The electrical cabinet of claim 1 ,wherein the instructions associated with the plurality of output devices are provided in the form of either a first binary value or a second binary value.

* * * * *